United States Patent Office 3,183,119
Patented May 11, 1965

3,183,119
METHOD OF POLISHING LEATHER
Ronald L. Broadhead, Danville, Ill., assignor to Standard Oil Company, Chicago, Ill., a corporation of Indiana
No Drawing. Filed Aug. 14, 1962, Ser. No. 216,713
8 Claims. (Cl. 117—142)

This invention relates to the polishing of leather whereby a dry-bright coating is produced.

An object of the invention is a method of polishing leather using a polish composition which has dry-bright characteristics. Another object of the invention is a method of polishing white leather using a white polish composition which is non-chalking and dries bright and is buffable to a higher gloss. Other objects of the invention will become apparent in the course of the detailed description thereof.

The method of the invention uses as the leather coating affording material a composition consisting essentially of a major amount of a hereinafter defined waxy resin (resinous waxy solid), a liquid organic solvent for the resin, and a pigment. In general, the resin is present in the polish composition in an amount between about 25 and 200 weight percent based on the solvent content. For use on white leather the coating affording material consists essentially of from about 35 to 50 weight percent of a normally liquid petroleum solvent, such as mineral spirits; from about 25 to 35 weight percent of resin; and from about 25 to 30 weight percent of titanium oxide.

The pigment content of the polish composition may be a dye corresponding to the color of the surface on which the polish is to be used or it may be a filler imparting color or opacity or both dye and filler may be present. The dye may be of the various types now utilized in leather polish compositions as are described in Modern Polishes and Specialties, Chemical Publishing Company, 1947; or it may be a stain such as used in the paint industry in connection with varnishes, lacquers, or shellacs. The exceptional solubility of "oil soluble dye" in the resin-solvent component of the polish composition of the invention imparts very great flexibility to the colored polishes which may be produced.

Fillers which provide color and/or opacity may be present in the polish composition for use on surfaces requiring covering of mars, such as scuffed leather or for imparting appearance, such as on white leather. Illustrative fillers are titanium oxide, lithopone, precipitated chalk, zinc oxide, and potassium carbonate. The amount of dye present will be dependent upon the requirements of the particular polish; in general the dye component will be present in an amount from about 0.5 to 10 percent based on composition. Fillers likewise will be present in amounts as determined by the particular requirements and the particular filler. For highest quality white leather polishes, titanium dioxide is preferred as a filler and the amount present will be between about 15 and 40 weight percent and more usually between about 25 and 30 weight percent based on composition.

WAXY RESIN

The polish used in the method of this invention utilizes a waxy resin which is the polyesterification-condensation reaction product of a monoester of a benzene tricarboxylic acid or anhydride and an alkanol containing from at least 18 to about 30 carbon atoms with a $C_2$-$C_6$ alkanediol having an acid number (mg. KOH per g. of resin) of not more than about 30.

An already existing monoester may be utilized; or a monoester may be made as a first step in the preparation of the resin. A hereinafter defined benzene tricarboxylic acid or anhydride is reacted with an alkanol—or mixture thereof—containing from at least 18 to about 30 carbon atoms. Illustrative alkanols are stearyl, $C_{18}$; docosanol, $C_{22}$; caryl, $C_{26}$ and myricyl, $C_{30}$. A very suitable ester is made from the mixture of $C_{18}$, $C_{20}$ and $C_{22}$ alkanols available commercially, where the $C_{22}$ alkanol is the predominate component; a particular suitable mixture of these alkanols contains 90% or more of the $C_{22}$ alkanol.

The acidic reactant is an unsubstituted benzene tricarboxylic acid or an anhydride thereof, i.e., only carboxyl (and anhydride) groups are present. These are trimellitic acid, trimellitic anhydride, trimesic acid, hemimellitic acid and hemimellitic anhydride.

When the monoester is formed from the acidic member and an alkanol, the acidic member:alkanol reaction charge is in a mole ratio from about 1:0.9 to about 1:1.1 and preferably an equimolar ratio.

The acidic member and the alkanol are vigorously agitated and the reaction carried out at a temperature below about 120° C.—this is in order to avoid formation of diesters and triesters. Generally the monoester reaction is carried out at a temperature from about 80° C. to 120° C., and more usually from about 100° C.–115° C.

The waxy resin is obtained by condensing the "monoester" and an alkanediol containing from 2 to 6 carbon atoms, such as ethylene glycol, propylene glycol, and hexanediol. Particularly suitable alkanediols are neopentyl glycol and 1,4-butanediol.

The condensation reaction is carried out under conventional conditions for polyesterification-condensation reactions. For example, the reaction zone is vigorously agitated to improve contacting while the temperature is maintained between about 125° C. and 225° C., commonly on the order of 170° C. Water produced in the reaction is continuously withdrawn. The time of reaction is determined by the type of reactants and the temperature of reaction; the waxy solid resin product has an Acid Number of not more than about 30.

When an essentially pure monoester is used in the condensation reaction, the mole ratio of monoester to the alkanediol in said reaction zone is between about 1:1 and about 1.25:1.

In the more usual instances when the "monoester" is made by direct reaction of acidic member and alkanol before the condensation reaction, the ratio of reactants in the condensation zone is related to the acidic member charged to the "monoester" prepared for simplicity in directions. The mole ratio of acidic member in the charge to the "monoester" preparation to the alkanediol is from about 1:0.9 to about 1:1.1 and is preferably 1:1.

SOLVENT

These resins are very soluble in solvent for natural waxes and solid paraffins. Examples of these solvents are naphtha, mineral spirits, benzene, toluene and chlorobenzenes. Also, these resins have a large solubility in alcohols such as isopropanol and butanol. The preferred solvent is a normally liquid petroleum solvent such as naphtha, odorless naphtha, VM&P naphtha and mineral spirits.

ILLUSTRATIONS

The waxy resin used in making the polishes utilized in the following examples was made as follows: In an ordinary beaker with a propeller stirrer, one mole each of trimellitic anhydride and a commercial mixture of $C_{18}$, $C_{20}$ and $C_{22}$ alkanols—90% of the $C_{22}$—were reacted at a temperature over the range of 100°–115° C. At the beginning the beaker contained a slurry of solid anhydride particles in the liquid alcohol, at the end, the beaker contained a pasty solid of monoester. This monoester and 1.25 moles of neopentyl glycol were reacted, with vigorous stirring, in a flask fitted with a reflux condenser and water-trap, at 175°–195° C. for 4 hours. The product was a pale tan, waxy resin with an acid number of 25.

The solvent used in these polishes was mineral spirits which had an ASTM distillation range of 307° F.–397° F. (153° C.–203° C.), a flash point of 104° F. (40° C.) and a kauri-butanol number of 36.5.

*Example 1*

50.0 grams of the waxy resin were dissolved in 50.0 grams of hot mineral spirits, 45.0 grams titanium dioxide were added and the charge was thinned with 30 grams of mineral spirits before ball milling for 5 hours. The product was fluid after milling but set to a soft paste on standing for several hours. The white paste dried at room temperature to a soft gloss when applied to white shoes. There was no chalking of the dry polish coat when the shoes were rubbed against other objects.

*Example 2*

25.0 grams of the waxy resin were dissolved in 40.0 grams of warm mineral spirits. 25.0 grams titanium dioxide were added and the charge was passed through a roller mill. The resulting product set to a soft paste. A coating, when applied to shoes, dried bright at room temperature and buffed to an even higher gloss.

*Example 3*

27.5 grams of the waxy resin described above were dissolved in 30.0 grams warm mineral spirits, 25.0 grams titanium dioxide were added and the mixture was passed through a roller mill. This polish was a firmer paste than that of Example 2. When applied to shoes, the coating dried bright at room temperature. This dry coat buffed to a higher gloss than the product of Example 2 (because of the greater ratio of wax to pigment).

*Example 4*

23.2 grams of titanium dioxide and 36.8 grams of mineral spirits which had been ball milled together overnight were warmed together with 20.9 grams of waxy resin to give a fluid product on cooling. This fluid polish when applied to white shoes dried bright at room temperature.

*Example 5*

60.0 grams of waxy resin were dissolved in 40.0 grams of mineral spirits after warming. 6.0 grams of No. 248 brown mahogany stain from the Glidden Company were added. The product was a soft paste which formed a dried bright coating after application to brown shoes.

This is a continuation-in-part of my co-pending application, Serial No. 860,640, filed December 21, 1959, now abandoned.

Thus having described the invention, what is claimed is:

1. A method of polishing leather, which method comprises applying to the surface of the leather to be polished a coating of a hereinafter defined polish composition and allowing said coating to dry at ambient temperature whereby a dry-bright coating is obtained on said leather surface, said polish composition consisting essentially of (1) a major amount of waxy resin, (2) a liquid organic solvent therefor, and (3) a pigment, said resin consisting of the condensation reaction product of (A) a monoester of (i) an acidic member selected from the class consisting of benzene tricarboxylic acids and anhydrides thereof and (ii) an alkanol containing from at least 18 to about 30 carbon atoms, said monoester having a mole ratio of said acidic member to said alkanol of from about 1:0.9 to about 1:1.1, said (i) and said (ii) being reacted at a temperature below about 120° C., and (B) an alkanediol containing from 2 to 6 carbon atoms, in a mole ratio of acidic member present in the charge to A to said alkanediol of from about 1.1:1 to about 1.3:1, at a temperature between about 125° C. and 225° C., with continuous withdrawal of water of reaction until condensation is essentially complete, to obtain a waxy resin product having an Acid Number of not more than about 30.

2. The method of claim 1 wherein said resin is present in an amount between about 25 and 200 weight percent, based on said solvent.

3. The method of claim 1 wherein said solvent is a liquid petroleum product.

4. The method of claim 1 wherein said alkanol is docosanol.

5. The method of claim 1 wherein said acidic number is trimellitic anhydride.

6. The method of claim 1 wherein said alkanediol is neopentyl glycol.

7. A method of polishing white leather which method comprises applying to the surface of the leather to be polished a coating of a hereinafter defined polish composition and allowing said coating to dry at ambient temperature whereby a dry-bright, non-chalking coating is obtained on said leather surface, said polish composition consisting essentially of (1) a major amount of waxy resin, (2) a normally liquid petroleum solvent therefor and (3) titanium dioxide pigment, said resin consisting of the condensation reaction product of (A) a monoester of (i) an acidic member selected from the class consisting of benzene tricarboxylic acids and anhydrides thereof and (ii) an alkanol containing from at least 18 to about 30 carbon atoms, said monoester having a mole ratio of said acidic member to said alkanol of from about 1:0.9 to about 1:1.1, said (i) and said (ii) being reacted at a temperature below about 120° C., and (B) an alkanediol containing from 2 to 6 carbon atoms, in a mole ratio of acidic member present in the charge to A to said alkanediol of from about 1.1:1 to about 1.3:1, at a temperature between about 125° C. and 225° C., with continuous withdrawal of water of reaction until condensation is essentially complete, to obtain a waxy resin product having an Acid Number of not more than about 30.

8. The method of claim 7 wherein said resin is the product of trimellitic anhydride, docosanol and neopentyl glycol.

References Cited by the Examiner

UNITED STATES PATENTS

| | | | |
|---|---|---|---|
| 1,942,146 | 1/34 | Kollek et al. | 117—142 |
| 2,939,857 | 6/60 | Bolton et al. | 260—75 XR |
| 2,989,420 | 6/61 | Zdanowski | 117—142 XR |
| 3,026,300 | 3/62 | Bolton | 260—40 XR |
| 3,037,955 | 6/62 | Carman | 117—142 XR |
| 3,040,001 | 6/62 | Broadhead | 260—77 |

ALEXANDER H. BRODMERKEL, *Primary Examiner.*

MORRIS LIEBMAN, *Examiner.*

UNITED STATES PATENT OFFICE
CERTIFICATE OF CORRECTION

Patent No. 3,183,119                                  May 11, 1965

Ronald L. Broadhead

It is hereby certified that error appears in the above numbered patent requiring correction and that the said Letters Patent should read as corrected below.

Column 4, line 21, for "number" read -- member --.

Signed and sealed this 28th day of September 1965.

(SEAL)
Attest:

ERNEST W. SWIDER                                    EDWARD J. BRENNER
Attesting Officer                                          Commissioner of Patents